United States Patent [19]

Kim

[11] Patent Number: 4,695,885

[45] Date of Patent: Sep. 22, 1987

[54] AUTOMATIC BRIGHTNESS CONTROL DEVICE

[76] Inventor: Joo W. Kim, Kuro-Apartment 3 dong, Room 301, Kuroku, Seoul, Rep. of Korea

[21] Appl. No.: 813,700

[22] Filed: Dec. 27, 1985

[30] Foreign Application Priority Data

Dec. 28, 1984 [KR] Rep. of Korea ............. 14312/84[U]

[51] Int. Cl.⁴ .................... H04N 5/235; H04N 5/57
[52] U.S. Cl. ..................................... 358/168; 358/74; 358/243
[58] Field of Search ................. 358/168, 169, 74, 243; 340/793; 315/383

[56] References Cited

U.S. PATENT DOCUMENTS

| 4,356,436 | 10/1982 | Barten et al. | 358/168 X |
| 4,489,349 | 12/1984 | Okada | 358/168 |
| 4,514,727 | 4/1985 | Van Antwerp | 340/812 X |
| 4,628,362 | 12/1986 | Waehner | 358/169 X |

Primary Examiner—Michael A. Masinick
Assistant Examiner—E. Anne Toth
Attorney, Agent, or Firm—Birch, Stewart, Kolasch & Birch

[57] ABSTRACT

An automatic brightness control device for preventing deterioration of image quality caused by frequency image muting to delete unnecessary images on a video screen which comprises an input terminal, a scaler for obtaining a mean value, first and second switching devices, and a sample and hold and integrating device all connected in the combination.

5 Claims, 3 Drawing Figures

AUTOMATIC BRIGHTNESS CONTROL DEVICE

BACKGROUND OF THE INVENTION

1. Field of the invention

The present invention relates, in general, to an automatic brightness control device for use in an image reproducing apparatus to display images and, in particular, to an automatic brightness control device for use in preventing the deterioration of image quality caused by the frequent image muting to delete unnecessary images on the screen.

2. Description of the prior art

Generally, the prior image reproducing apparatus effects image muting to delete unnecessary images on the screen. When image muting is effected in the prior arts, the screen of image reproducing apparatus is formed in a black level without regard to the brightness level achieved before image muting is effected. However, when image muting is effected frequently, screen brightness darkens in its entirety, thereby deteriorating the reproduced image quality.

Therefore, it is an object of the present invention to provide an automatic brightness control device for use as a part of the image reproducing apparatus to adjust the brightness level of image muting to the average brightness level achieved just before image muting is effected.

Further, it is an object of the present invention to provide an automatic brightness control device for use as a part of the image reproducing apparatus to obtain a stabilized brightness level by taking the average brightness level of the last picture plane just before the present image muting is started.

Also, it is an object of the present invention to provide an automatic brightness control device for use as a part of the image reproducing apparatus to obtain a bright and stable picture plane which admits of no deterioration.

SUMMARY OF THE INVENTION

The present invention relates to an automatic brightness control device composed of a scaler to obtain the mean value from the integrated value for an image signal on a unit of one picture plane period, two(1st and 2nd) switching devices, a sample/hold and an integrator for sampling and/or holding the mean value per image. Therefore, the image reproducing apparatus equipped with an automatic brightness control device under the present invention is characteristic of bright picture plane which suffers no deterioration.

The present invention may be usable in combination with any image reproducing systems using a cathode ray tube, namely, TV set, monitor and so forth.

Other features and advantages of the present invention will become apparent when reviewed by means of accompanying drawings executed in conjunction with the detailed description of the presently preferred embodiment thereof.

DETAILED DESCRIPTION OF THE INVENTION

Figure 1:
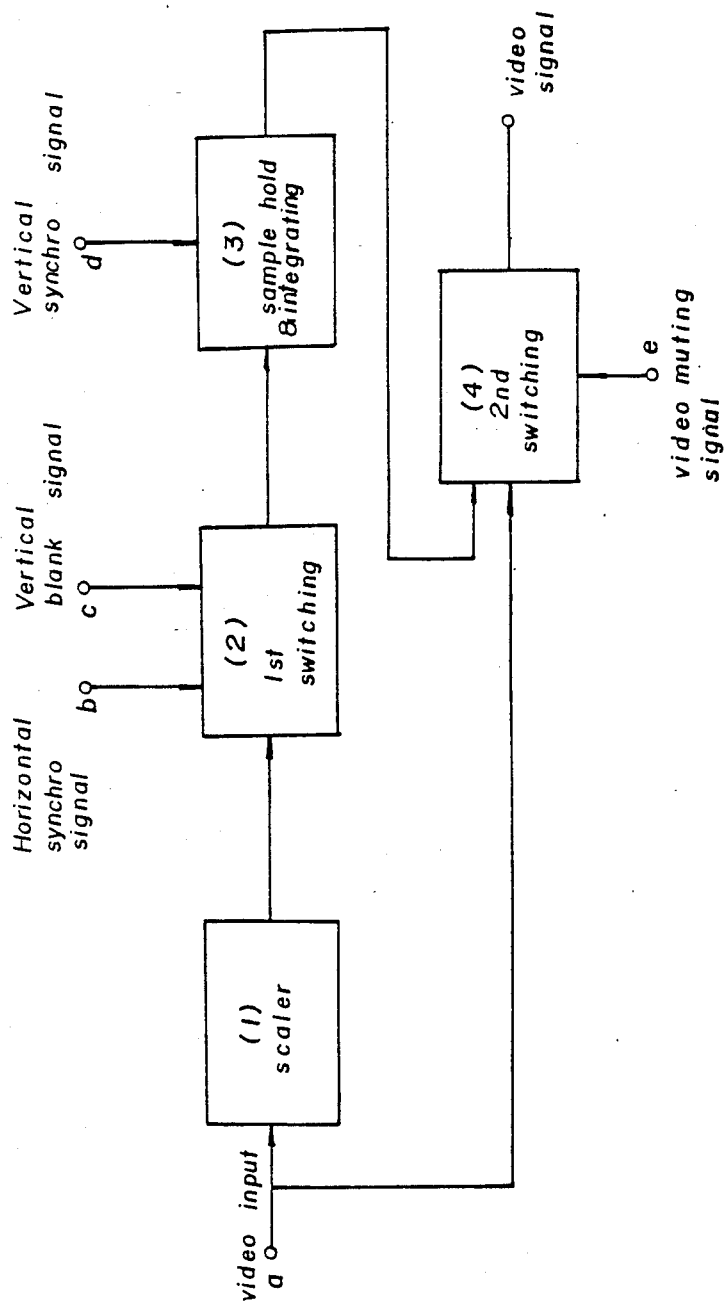
FIG. 1 is a block diagram of the automatic brightness control device of the present invention.

Referring to FIG. 1, it shows the automatic brightness control device, which operates when used in the following manner: Connect the video input signal(10) to the scaler(1) which enables the video signal to obtain the mean value from the integrated value on a unit of one picture plane period. Connect the average output from the scaler(1) to the first switching device(2), but switch the scaled output off to the horizontal synchronizing signal and vertical blanking signal by connecting the horizontal synchronizing signal terminal(20) and vertical blanking signal terminal(30) to the first switching device(2). Connect the output of the first switching device(2) to the sample/hold and integrating device(3), but integrate the switched video signal and obtain the mean value by connecting the vertical synchronizing signal terminal(40) to the sample/hold and integrating device(3). Sample/hold the mean value for every image with vertical synchronizing signal and send it to the second switching device(4). Integrate the next video signal by resetting the integrator and switch the mean value from the sample/hold and integrating device(3) off to the video signal for outputting by connecting the output from the video signal terminal (10), video muting signal terminal(50) and sample/hold and integrating device(3) to the second switching device.

As the result, the mean value for a signal(v(t)) during a normal period of time(T) is given as follows:

$$\approx \int_{t}^{t+T} v(\tau)d\tau$$

According to the formula given, the scaler(1) divides the image signal by its remaining time(T) and obtains a predetermined unit value before integrating the image signal. As to scaler(1), it is better to place it in the front of the sample/hold and integrating device(3) than to place it in the rear thereof in order to prevent congestion therewith.

In the first switching device(2), a high level of value is outputted to switch the image signal only while it exists during a period of time given for one frame. The first switching device(2) is controlled by the horizontal synchronizing signal and vertical blanking signal. It starts operation at a period horizontally synchronous with loading of image signal after vertical blanking signal is up. As the image signal is not existent when each horizontal synchronizing period and color burst signal are existent, the first switching device is switched off.

In the sample/hold and integrating device(3), switching output signal from the first switching device(2) is integrated to obtain the mean value and the mean value so obtained is sampled and held by the vertical synchronizing signal for every frame with the integrator being reset.

In the next picture plane frame, the average brightness thereof is calculated anew.

Figure 2:
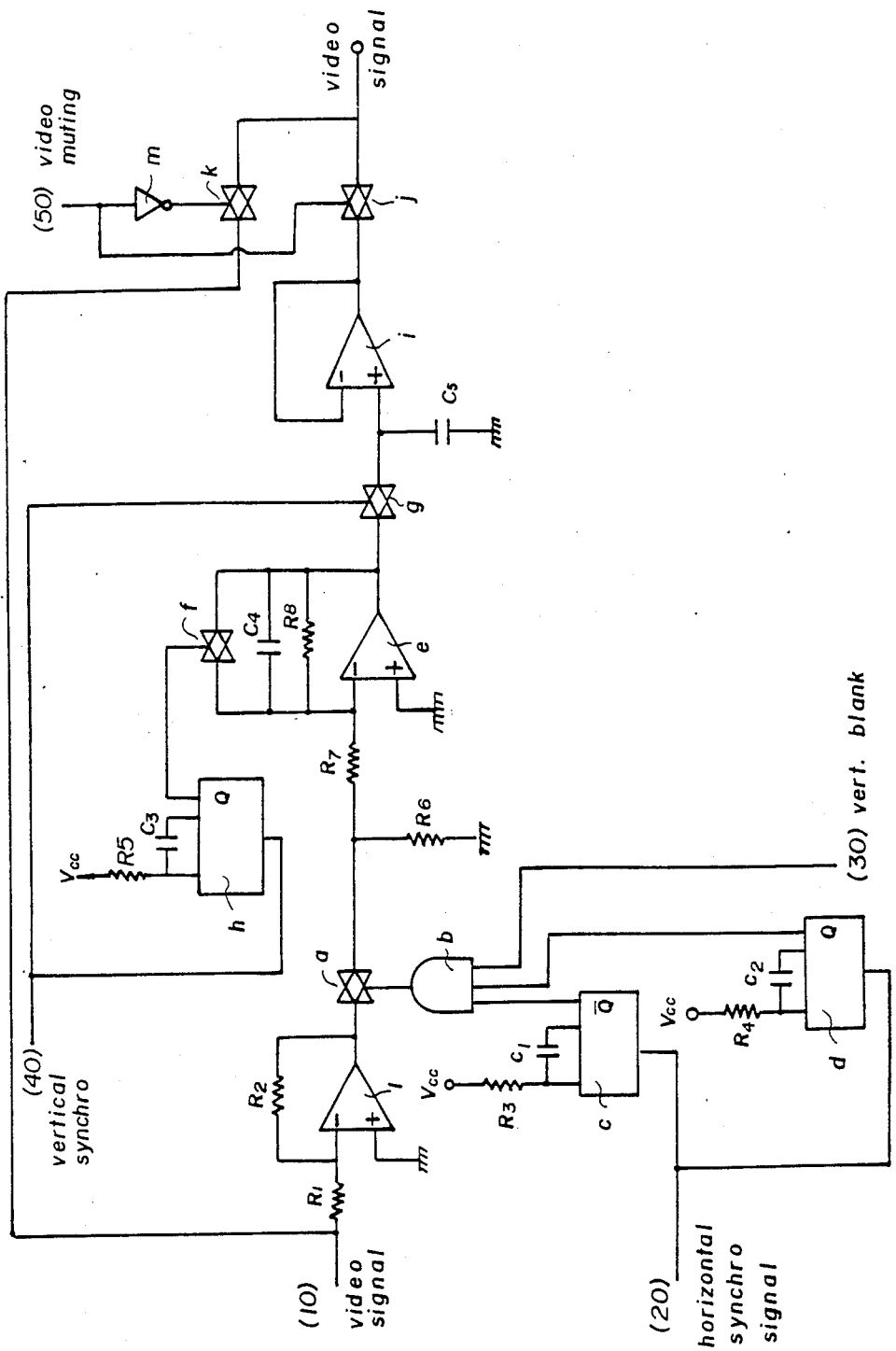
FIG. 2 depicts a detailed circuit embodied of the present invention.
Figure 3:
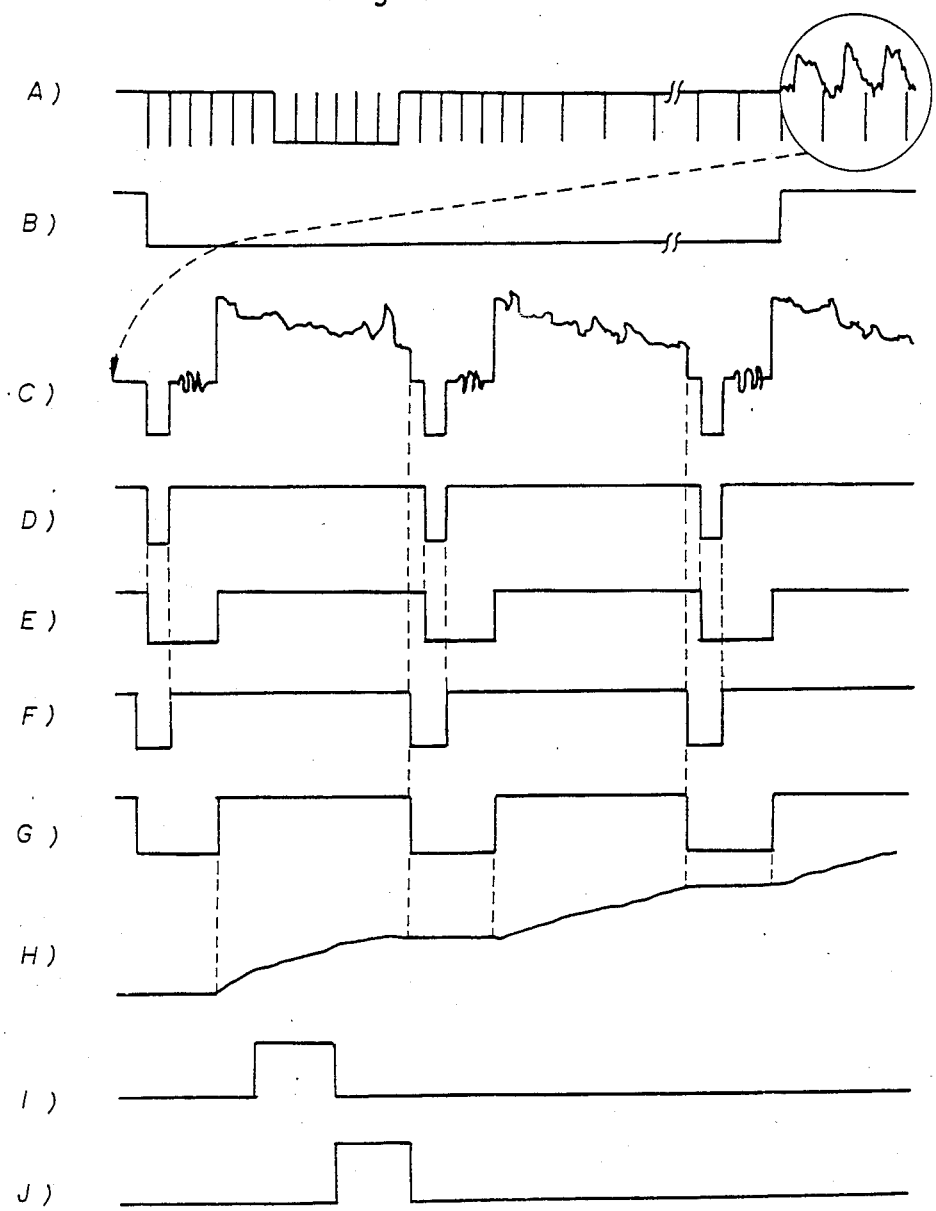
FIG. 3 depicts waveforms at each node of the circuit shown in FIG. 2.

FIGS. 2 and 3 show a detailed circuit and waveforms of the present invention. The scaler(1) amplifies the image signal so properly as to calculate the mean value by means of resistor(R1,R2).

The first switching device is composed of an analog switch(a), 3-input NAND gate and two mono-stable oscillators (c,d).

The vertical blanking signal as shown in FIG. 3C turns to low level where the image signal of one field comes to a close and then to high level where the image signal of next field makes a start. When the vertical blanking signal is low level, no image signal is existent. FIGS. 3A and 3B are indicative of such relationships between the image signal and the vertical blanking signal. As to horizontal synchronizing signal, it generates a signal to cut off the switching operation of analog switch(a) by triggering the mono-stable oscillators(c,d) while back porch of the horizontal synchronizing signal and color burst signal are existent in the field.

FIG. 3C is an enlarged view of waveforms as shown in FIG. 3A. It shows that no image signal is existent where a back porch of the horizontal synchronizing signal(20), the horizontal synchronizing signal and color burst signal of 3.58 MHz are loaded.

FIG. 3D shows the horizontal synchronizing signal separated from the image signal. A signal is generated by trigggering the mono-stable oscillator(c) as shown in FIG. 2 at the sinking point(a) while time constant is determined by the resistor(R2) and capacitor(C1) and a signal is generated by triggering the mono-stable oscillator(d) as shown in FIG. 2 at the rising point while time constant is determined by the resistor(R4) and capacitor(C2).

As to mono-stable oscillator(c), it determines the values of resistor(R3) and capacitor(C1) to enable its output to continue while the horizontal synchronizing signal and color burst signal are existent, whereas mono-stable oscillator(d) determines the values of resistor(R4) and capacitor(C2) to enable its output to continue just before the back porch.

FIG. 3E shows an inverted output of the mono-stable oscillator(c) as shown in FIG. 2. FIG. 3F shows an output of the mono-stable oscillator(d).

The signals shown in FIG. 3E and 3F will appear like a signal in FIG. 3F at an interval other than the vertical blanking interval by joining the vertical blanking signal in FIG. 3B at the 3-input NAND gate(b) in FIG. 2.

The analog switch(a) is cut off by the signal as shown in 3G at the portion where back porch, horizontal synchronizing signal and color burst signal are loaded and only the portion where the image signal is existent is sent to the sample/hold and integrating device(3).

The sample/hold and integrating device(3) as shown in FIG. 2 is composed of an integrator(e), two analog switches (f,g), a mono-stable oscillator(h), a buffer(i) and peripheral elements(resistors and capacitors). The integrator(e) integrates the image signal switched in the first switching device(2). As the input comes in at a zero level while switching is cut off, the output of integrator maintains a fixed value. The vertical synchronizing signal samples and holds the mean value for the last field through analog switch(g) and then triggers the mono-stable oscillator(h) at the sinking point by resetting the integrator(e) in order to generate a switching signal by which the integration is made to start again in the next field.

The mono-stable oscillator(h) generates an output during an interval determined by the resistor(R5) and capacitor(C3) and this interval should not proceed to the image signal-remaining portion beyond the vertical blanking interval.

The mean value which is switched by the analog switch(g) during an interval available for vertical synchronization and has passed onto the buffer input terminal is charged in the capacitor(C5) and supplies a fixed value to the buffer output when the integrator(e) is calculating the mean value of image signal in the next field.

FIGS. 3I and 3J show the relationships between vertical synchronizing signal and integrator resetting signal.

The second switching device(4) in FIG. 1 is composed of two analog switches(j,k) and an inverter(m).

When the image muting signal as shown in FIG. 3E comes in, the sampled/held mean value will be outputted by turning on the analog switch (J) and turning off the analog switch(k) with an inverter(m).

When the image muting is not workable, the signal as shown in FIG. 3E will come in at a low level and output the original image signal by turning off the analog switch (j) and turning on the analog switch(k).

As described hereinabove, the present invention is designed to keep picture planes clean and bright at all times by preventing the brightness of image from being darkened owing to the frequent image muting.

While the present invention is described in some detail and in one embodiment, it will be apparent to those skilled in the art that various changes and modifications can be made without departing from the spirit of the invention. Therefore, the invention should not be limited by the description made above but only by the claims which follow.

What is claimed is:

1. An automatic brightness control device for preventing deterioration of large quality caused by frequent image muting to delete unnecessary images on a video screen which comprises:

an input terminal for receiving an integrated image signal, a scaler connected to said input terminal for providing a mean value signal of the input signal, first switch means connected to said scaler for transmitting an output signal of the scaler in response to a horizontal synchronizing signal and a vertical blanking signal, sample/hold and integrating circuit connected to said first switch means for integrating the mean value signal and a vertical synchronizing signal sample, and holding the mean value signal until the integrating circuit is reset, and second switch means connected to said sample/hold for transmitting the mean value signal in response to a video muting signal when the image signal is turned off.

2. The automatic brightness control device of claim 1 wherein the automatic brightness control device further stabilizes the brightness level of the image signal until the video muting signal is activated.

3. The automatic brightness control device of claim 1 wherein the scaler consists of a feedback amplifier and resistors R1 and R2.

4. The automatic brightness control device of claim 1 wherein the first switch means consists of an analog switch.

5. The automatic brightness control device of claim 1 wherein the second switch means consists of an analog switch.

* * * * *